United States Patent
Sano et al.

(10) Patent No.: US 11,421,871 B2
(45) Date of Patent: Aug. 23, 2022

(54) COMBUSTIBLE WASTE INJECTION DEVICE AND METHOD FOR OPERATING THE SAME

(71) Applicant: TAIHEIYO CEMENT CORPORATION, Tokyo (JP)

(72) Inventors: Yuya Sano, Chiba (JP); Kouichi Naitou, Tokyo (JP); Kensuke Kitazawa, Chiba (JP); Hidenori Tsukidate, Chiba (JP)

(73) Assignee: TAIHEIYO CEMENT CORPORATION, Tokyo (JP)

( * ) Notice: Subject to any disclaimer, the term of this patent is extended or adjusted under 35 U.S.C. 154(b) by 0 days.

(21) Appl. No.: 16/968,524

(22) PCT Filed: Aug. 14, 2019

(86) PCT No.: PCT/JP2019/031923
§ 371 (c)(1),
(2) Date: Aug. 7, 2020

(87) PCT Pub. No.: WO2021/029028
PCT Pub. Date: Feb. 18, 2021

(65) Prior Publication Data
US 2022/0163198 A1    May 26, 2022

(51) Int. Cl.
*F23D 1/02* (2006.01)
*F23L 1/00* (2006.01)

(52) U.S. Cl.
CPC .............. *F23D 1/02* (2013.01); *F23L 1/00* (2013.01); *F23D 2201/20* (2013.01); *F23D 2900/01001* (2013.01)

(58) Field of Classification Search
CPC ............ F23D 1/02; F23D 2201/20; F23D 2900/01001; F23L 1/00
See application file for complete search history.

(56) References Cited

U.S. PATENT DOCUMENTS

| 6,017,213 A | 1/2000 | Murata et al. |
| 8,393,893 B2 * | 3/2013 | Schroder .................. F23G 5/20 431/189 |

(Continued)

FOREIGN PATENT DOCUMENTS

| CN | 201106847 Y | 8/2008 |
| JP | S60105806 A | 6/1985 |

(Continued)

OTHER PUBLICATIONS

Korean Office Action for Korean Patent Application No. 10-2020-7025136, dated Jan. 5, 2021 in 10 pages including English translation.

(Continued)

*Primary Examiner* — Alfred Basichas
(74) *Attorney, Agent, or Firm* — Knobbe, Martens, Olson & Bear, LLP

(57) ABSTRACT

There is provided a combustible waste injection device and a method for operating the same which can suppress a landing combustion of a combustible waste and suppress excessive change of a flame state from a cement kiln burner even if a rate of using the combustible waste fluctuates. The combustible waste injection device according to the present invention is provided with a combustible waste flow channel which is arranged in an inner side of the air flow channel in an innermost shell, is installed in parallel to an axial direction of the cement kiln burner device and is provided for flow feeding a combustible waste flow, and an assist air inflow port which can flow an assist air flow into the combustible waste flow channel toward an axis center of the combustible waste flow channel in the vicinity of an injection port of the combustible waste flow channel, and the assist air inflow port is arranged at a plurality of positions in relation to a circumferential direction.

8 Claims, 7 Drawing Sheets

(56) References Cited

U.S. PATENT DOCUMENTS

| | | | | |
|---|---|---|---|---|
| 2016/0008830 A1* | 1/2016 | Yamamoto | ............... | F23D 14/56 |
| | | | | 431/285 |
| 2021/0054996 A1* | 2/2021 | Sano | ..................... | F27B 7/34 |
| 2021/0222874 A1* | 7/2021 | Sano | ..................... | F23D 1/02 |
| 2021/0222875 A1* | 7/2021 | Sano | ..................... | F23G 7/12 |
| 2021/0404649 A1* | 12/2021 | Sano | ..................... | C04B 7/45 |

FOREIGN PATENT DOCUMENTS

| | | |
|---|---|---|
| JP | H07-280212 A | 10/1995 |
| JP | H09-159135 A | 6/1997 |
| JP | 2003-083519 A | 3/2003 |
| JP | 2003-192406 A | 7/2003 |
| JP | 2007-084434 A | 4/2007 |
| JP | 2008-222504 A | 9/2008 |
| JP | 2010-230196 A | 10/2010 |
| JP | 2011-207682 A | 10/2011 |
| JP | 2013-090522 A | 5/2013 |
| JP | 2015-190731 A | 11/2015 |
| JP | 3213113 U | 10/2017 |
| KR | 10-0655046 B1 | 12/2006 |
| KR | 2018-0009511 A | 1/2018 |
| TW | 426646 B | 3/2001 |
| WO | 2009/034626 A1 | 3/2009 |

OTHER PUBLICATIONS

Chinese Office Action for Chinese Patent Application No. 201980016003.5, dated Oct. 28, 2021 in 12 pages including English translation.
Taiwanese Office Action for Taiwanese Patent Application No. 109104740, dated Aug. 5, 2020 in 8 pages including English Translation.
Chinese Office Action for Chinese Patent Application No. 201980016003.5, dated May 11, 2021 in 19 pages including English translation.
International Search Report for International Application No. PCT/JP2019/031923, dated Sep. 10, 2019 in 10 pages.
Japanese Office Action for Japanese Patent Application No. 2019-561196, dated Dec. 19, 2019 in 8 pages including English Translation.
Chinese Office Action issued for Chinese Patent Application No. 201980016003.5, dated Mar. 9, 2022 in 11 pages including English translation.

* cited by examiner

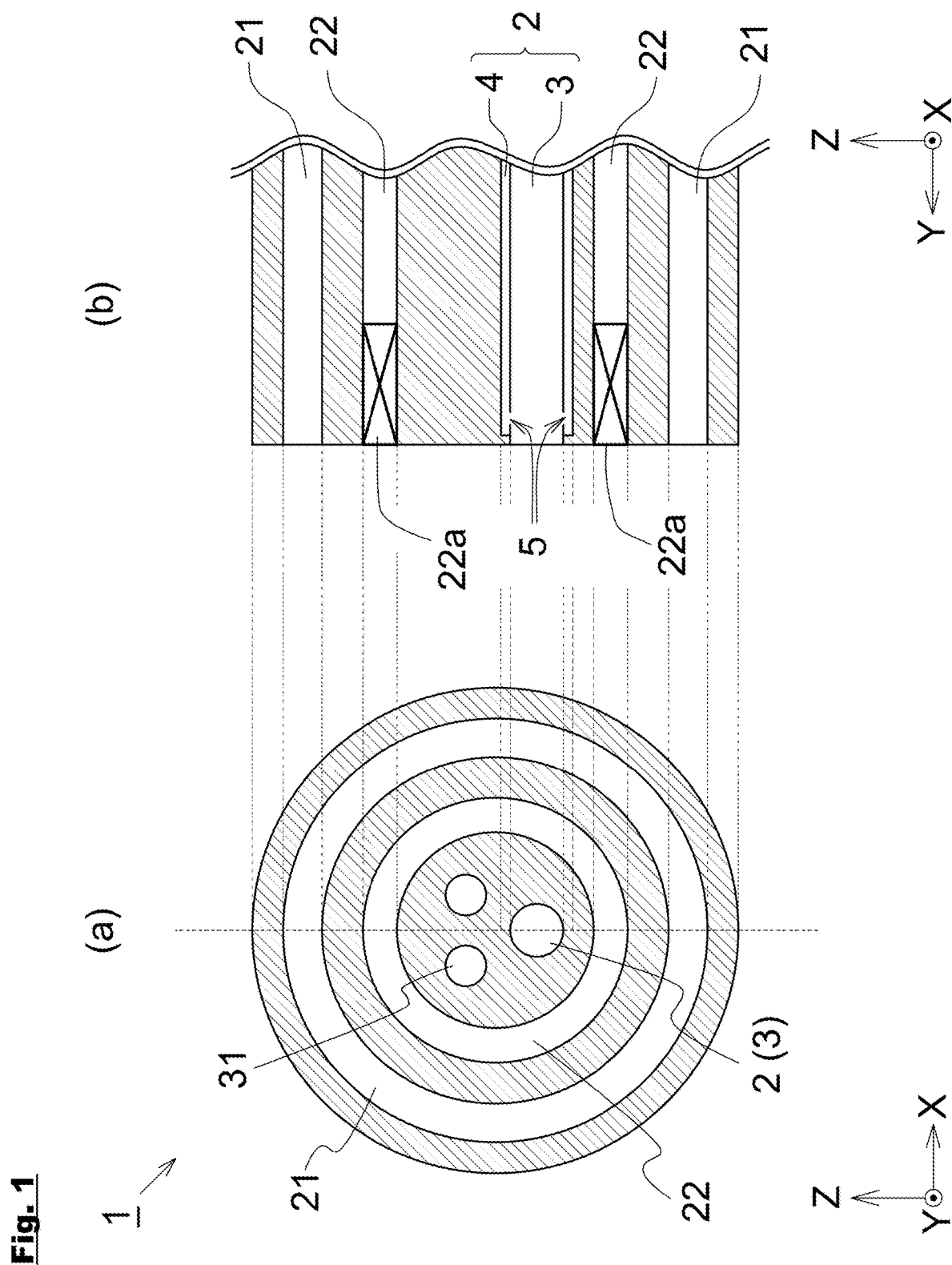

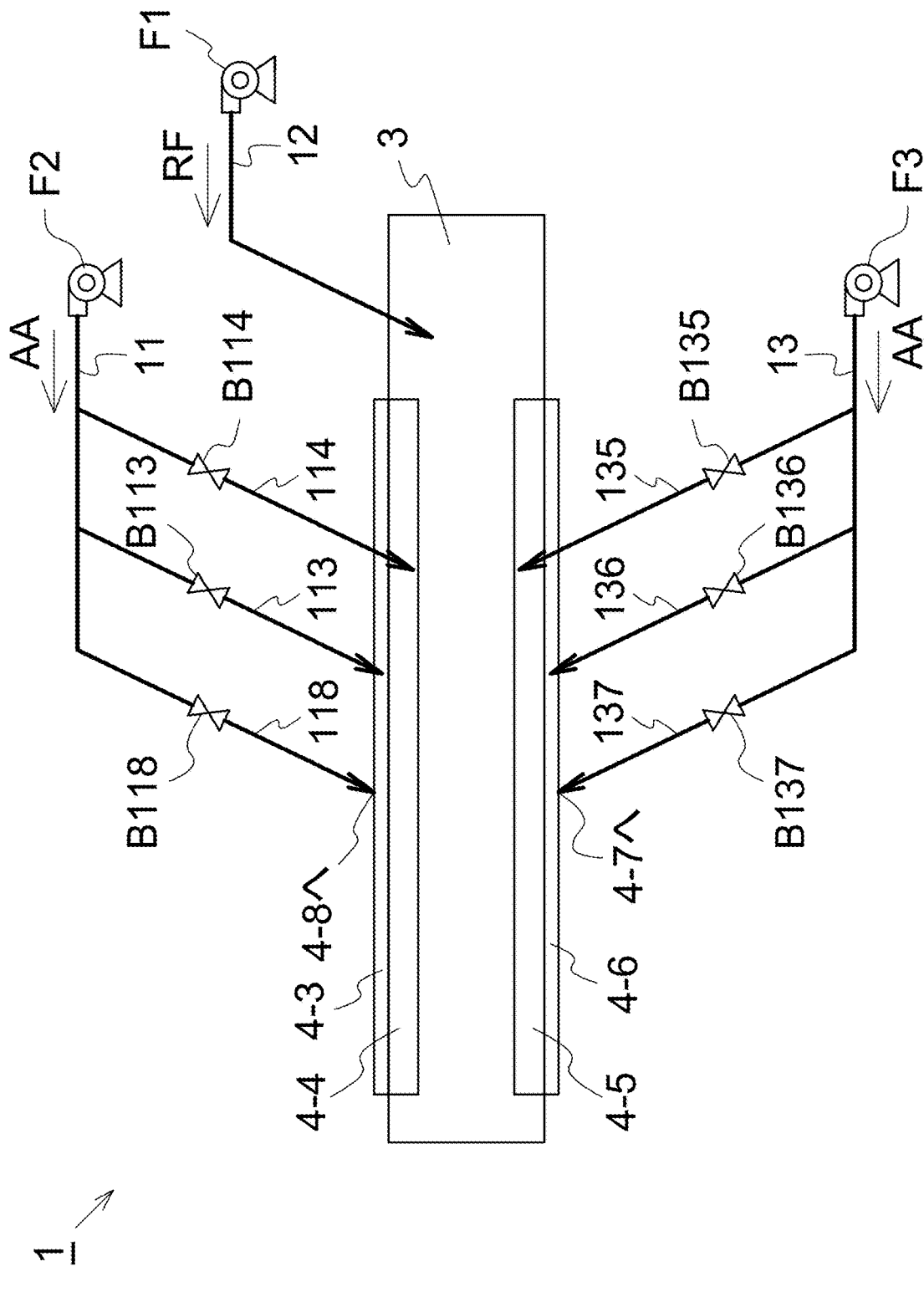

COMBUSTIBLE WASTE INJECTION DEVICE AND METHOD FOR OPERATING THE SAME

CROSS-REFERENCE TO RELATED APPLICATIONS

This application is the U.S. National Phase under 35. U.S.C. § 371 of International Application PCT/JP2019/031923, filed Aug. 14, 2019.

TECHNICAL FIELD

The present invention relates to a combustible waste injection device which is attached to a cement kiln burner, and a method for operating the same.

BACKGROUND ART

Combustible wastes such as waste plastics, wood chips, and automobile shredder residues (ASR) have heat quantities enough to be used as calcination fuels. Therefore, an effective utilization of the combustible wastes has been promoted for the supplemental fuels of the pulverized coals which are the main fuels, in a rotary kiln for use in cement clinker calcination. Hereinafter, such rotary kiln for use in cement clinker calcination will be referred to as "cement kiln".

Conventionally, in a fuel recycling of the combustible wastes in the cement kiln, utilization in a calcining furnace installed in a kiln tail portion has been promoted, the kiln tail portion less affecting a quality of the cement clinker. However, since a used amount of the combustible wastes in the calcining furnace has neared saturation, a technique of utilizing in a main burner which is installed in a kiln front portion has been developed.

Here, in the case where the combustible waste is utilized as a supplemental fuel in a main burner of the cement kiln (hereinafter, referred to as "cement kiln burner"), there may occur a phenomenon that the combustion is kept even when the combustible waste ejected from the cement kiln burner lands on the cement clinker within the cement kiln (hereinafter, referred to as "landing combustion"). In the case where such landing combustion occurs, the cement clinker around the occurring landing combustion of the combustible waste is reduction fired, thereby generating whitening of the cement clinker and abnormality in the cement clinker generating reaction.

In order to prevent the landing combustion of the combustible waste ejected from the cement kiln burner, there are several possible ways. One of the ways is to maintain a floating state of the combustible waste within the cement kiln for a long period of time and complete the combustion of the combustible waste in the floating state. Another of the ways is to form a preferable combustion environment of the combustible waste and accelerate a combustion velocity of the combustible waste. Still another of the ways is to make the combustible waste land on a far side (a kiln tail side) within the cement kiln and complete the combustion of the combustible waste before a clinker raw material reaches a main reaction area of the cement clinker generation reaction.

For example, the following Patent Document 1 discloses a combustible waste input structure constructed by a plurality of combustible waste burners each rotatably supporting an end portion of the rotary kiln and having a protruding amount between 200 and 500 mm from an end wall of a kiln front portion, as a technique for reducing an energy consumption for making the combustible waste land on the far side (the kiln tail side) within the cement kiln. Further, the following Patent Document 2 discloses a cement producing rotary kiln provided with an auxiliary burner which injects the combustible waste to a main fuel burner by an upward injecting angle on an outer periphery surface of the main fuel burner and at a vertically upper position from the main fuel burner, as a technique for more efficiently burning the combustible waste while avoiding occurrence of an adverse effect caused by the injection of the combustible waste.

PRIOR ART DOCUMENT

Patent Documents

Patent Document 1: JP-A-2003-90522
Patent Document 2: JP-A-2011-207682

SUMMARY OF THE INVENTION

Problems to be Solved by the Invention

In general, a rate between a used amount of a pulverized coal corresponding to a main fuel in the cement kiln burner and a used amount of the combustible waste corresponding to the supplemental fuel may fluctuate due to an availability and a property of the fuels. In order to prevent a quality of the cement clinker from changing even if the fluctuation of the fuel compositions occurs, there is demanded a technique of stabilizing a flame state from the cement kiln burner. However, the methods in Patent Documents 1 and 2 include a problem that the flame state from the cement kiln burner widely fluctuates due to the amount of the combustible waste injected into the cement kiln and the injecting angle.

The present invention is made by taking the above problem into consideration and an object of the present invention is to provide a combustible waste injection device and a method for operating the same which can suppress a landing combustion of a combustible waste and suppress excessive change of a flame state from a cement kiln burner even if a rate of using the combustible waste fluctuates, in the case where the combustible waste is used as a supplemental fuel for producing a cement clinker.

Means for Solving the Problems

The inventors of the present invention have earnestly made a study of the problem mentioned above and have found that the problem mentioned above can be solved by the following combustible waste injection device. The combustible waste injection device is attached to a cement kiln burner device and has an injection port arranged near a center portion of the cement kiln burner device, in which the combustible waste injection device is provided at a plurality of positions, with air inflow ports (hereinafter, referred to as "assist air inflow ports") for flowing air (hereinafter, referred to as "assist air") into a conduit (hereinafter, referred to as "combustible waste flow channel") for the combustible waste near the injection port toward an axis center of the combustible waste flow channel.

More specifically, the present invention is a combustible waste injection device which can be attached to a cement kiln burner device having at least one air flow channel in an inner side of a powdered-solid-fuel flow channel, the combustible waste injection device including:

a combustible waste flow channel which is arranged in an inner side of the air flow channel in an innermost shell, is installed in parallel to an axial direction of the cement kiln burner device and is provided for flow feeding a combustible waste flow; and an assist air inflow port which can flow an assist air flow into the combustible waste flow channel toward an axis center of the combustible waste flow channel in the vicinity of an injection port of the combustible waste flow channel, characterized in that the assist air inflow port is arranged at a plurality of positions in relation to a circumferential direction.

The term "combustible waste" in the present description indicates a calcination fuel serving as a supplemental fuel constituted by a general waste and an industrial waste mainly based on an organic material such as waste plastics, wood chips, ASR, meat-and-bone meals or biomasses and having a combustibility, as mentioned above, which is supposed to be utilized as a fuel for a burner together with the powdered-solid-fuel (main fuel). More specifically, a particle size of the combustible waste is 30 mm or less. Further, "biomasses" are organic resources which can be utilized as a fuel except fossil fuels and are derived from living things, and shredded waste tatamis, shredded waste construction woods, wood chips and saw dusts correspond thereto, for example.

According to the structure mentioned above, the combustible waste is ejected out of the injection port of the combustible waste flow channel while moderately diffusing in a vertical direction within the cement kiln since the assist air flow is flowed toward the axis center of the combustible waste flow channel in the vicinity of the injection port (the cement kiln side end portion) of the combustible waste flow channel. As a result, a mixing state of the main fuel and the combustible waste (the supplemental fuel) is improved, the main fuel being injected into the cement kiln from the powdered-solid-fuel flow channel positioned so as to surround the injection port of the combustible waste injection device. Further, the main fuel is well mixed with a high-temperature air (a secondary air) supplied into the cement kiln from a cement cooler. On the basis of simultaneous processes of these mixings, an environment that the combustible waste and the main fuel can be efficiently burnt while moderately mixing is formed in the cement kiln. As a result, a combustion velocity of the combustible waste within the cement kiln is accelerated and the combustion of the combustible waste can be completed in the floating state as mentioned above, since the preferable combustion environment of the combustible waste is formed.

In particular, the assist air inflow port is preferably arranged at a plurality of positions sandwiching in a vertical direction a horizontal plane including the axis center of the combustible waste flow channel when cutting with a plane orthogonal to the axis center of the combustible waste flow channel.

According to the structure mentioned above, the combustible waste flow can be ejected upward in the vertical direction after the combustible waste flow is reduced in the direction of the axis center by the assist air flow flowing into from the assist air inflow port. As a result, the combustible waste is discharged with an elevation angle from the injection port of the combustible waste injection device. The floating state of the combustible waste continues for a long period of time within the cement kiln and the combustion of the combustible waste can be completed in the floating state since the combustible waste is discharged upward in the vertical direction as mentioned above. In the present description, the term "direction of axis center" indicates a direction from an outer peripheral side toward the axis center.

The combustible waste injection device may be provided at a position outside the combustible waste flow channel, with an assist air flow channel which is installed in parallel to the combustible waste flow channel, and the assist air flow channel may be communicated with the combustible waste flow channel via the assist air inflow port and be shielded from the combustible waste flow channel in an upstream side of the assist air inflow port.

An air flow rate flowing in the assist air flow channel is preferably structured such as to be independently controllable during operation, so as to eject the combustible waste flow flowing in the combustible waste flow channel upward in the vertical direction after reducing in the direction of the axis center. As a result, it is possible to easily regulate for maintaining an optimum flame state of the cement kiln burner even if the kind of the used powdered-solid-fuel (main fuel) and combustible waste (supplemental fuel) and a rate of using them change.

In the structure mentioned above, the combustible waste flow channel is provided at a predetermined distance from the injection port, with a plurality of assist air inflow ports which are communicated with the assist air flow channel. In this structure, the flow rate of the assist air flowing into the combustible waste flow channel through each of the assist air inflow ports is preferably structured such as to be independently controllable per assist air flow channel by a blower or a flow rate regulating valve which is connected to each of the assist air flow channel.

Further, more preferably, an air flow rate (referred to as "upward assist air flow rate) flowed into the combustible waste flow channel from the assist air inflow port positioned in a vertically lower side from a horizontal plane including the axis center when cutting with a plane orthogonal to the axis center of the combustible waste flow channel is equal to or more than an air flow rate (referred to as "downward assist air flow rate") flowed into from a vertically upper side of the horizontal plane. As a result, the floating state of the combustible waste continues for a long period of time within the cement kiln and the combustion of the combustible waste can be completed in the floating state, as mentioned above, since the combustible waste is discharged with an elevation angle from the injection port of the combustible waste injection device.

In particular, by regulating the air flow rate flowed into the combustible waste flow channel from the assist air inflow port or further regulating the rate between the upward assist air flow rate and the downward assist air flow rate among them, it is possible to control so that a shape of the flame from the cement kiln burner and a temperature distribution do not fluctuate even with the change in a rate of the supplemental fuel used in the cement kiln burner [=(supplemental fuel)/(main fuel+supplemental fuel)], and/or the kind or the property of the combustible waste used as the supplemental fuel.

Further, the assist air inflow port may be arranged at a plurality of positions sandwiching the vertical plane including the axis center in the horizontal direction when the combustible waste flow channel is cut by the plane orthogonal to the axis center. As a result, the combustible waste flow is exposed to the assist air flow having an equal air flow rate from a lateral direction, and is throttled in the lateral direction in addition to the vertical direction, thereby well occurring the state in which the combustible waste within the cement kiln after being injected from the combustible waste injection device diffuses while floating in whole circumferential directions including the vertical and lateral directions. According to this fact, a good mixing state between the main fuel, the secondary air and the combustible waste mentioned above is more securely formed around a whole circumference.

The assist air inflow port may be installed in a range between 10 mm and 600 mm from the injection port of the combustible waste flow channel. Within this range, the combustion of the combustible waste can be completed and promoted in the floating state in the combustible waste injection device which is provided with the combustible waste flow channel having a general inner diameter between 150 mm and 200 mm, and is operated at a general primary air flow rate (60 m$^3$/min to 120 m$^3$/min). The assist air inflow port may be arranged circumferentially over one circle, or may be arranged over two or more circles, that is, in a plurality or rows.

The shape of the assist air inflow port is not limited as long as the assist air inflow port throttles the flow of the combustible waste (combustible waste flow) fed by the primary air into the direction of the axis center. In the light of the throttle effect easily obtained by the assist air, the assist air inflow port is preferably formed into a circular shape having a diameter between 5 mm and 25 mm, or formed into a rectangular shape (a slit shape) having a long side in a peripheral direction and a short side in a flow channel direction and having a short side length between 3 mm and 15 mm. In the case where the assist air inflow port is formed into the circular shape, the assist air inflow ports may be arranged circumferentially at regular intervals, or may be arranged unequally spaced. In the latter case, it is preferable to arrange unequally spaced so that the assist air inflow ports are highly distributed near an intersection (a top portion and a bottom portion) between the vertical axis and the inner surface of the combustible waste flow channel when the combustible waste flow channel is cut by the plane orthogonal to the axis center.

Further, the assist air inflow port may be provided with an assist air delivery tool which can regulate an inflow angle of the assist air flow flowed into the combustible waste flow channel with respect to the flow feeding direction of the combustible waste flow which flow feeds within the combustible waste flow channel.

Further, the present invention is a method for operating the combustible waste injection device, characterized in that an upward assist air flow rate flowed into from a vertically lower side of the horizontal plane is equal to or more than a downward assist air flow rate flowed into from a vertically upper side of the horizontal plane. In this case, a rate of the downward assist air flow rate with respect to the upward assist air flow rate is preferably set between 0.5 and 0.9.

Further, a total amount (m$^3$/min) of the air flow rates flowed into the combustible waste flow channel from the assist air inflow port can be set to 5 weight % to 65 weight % of the primary air flow rate (m$^3$/min) flowing in the combustible waste flow channel. In the method for operating the combustible waste injection device, the primary air flow rate flowing in the combustible waste flow channel is not restricted, but can employ a normal condition for operating.

Further, the inflow angle of the assist air flow flowed into the combustible waste flow channel may be greater than 0 degrees and equal to or less than 90 degrees with respect to the flow feeding direction of the combustible waste flow which flow feeds within the combustible waste flow channel. According to the structure mentioned above, the assist air flow is inhibited from coming into collision in an opposite direction to the flow feeding direction of the combustible waste flow, and the combustible waste flow can be therefore ejected from the injection port in the state in which the combustible waste flow is reduced in the direction of the axis center, without preventing the combustible waste flow more than necessary.

Effect of the Invention

According to the combustible waste injection device and the method for operating the same of the present invention, it is possible to optionally change the rate of using the powdered-solid-fuel (the main fuel) and the combustible waste (the supplemental fuel) such as the waste plastic piece while maintaining the optimum state of the flame from the cement kiln burner, and it is possible to effectively utilize the combustible waste (the supplemental fuel), for example, having a particle size of 30 mm or less.

BRIEF DESCRIPTION OF THE DRAWINGS

FIG. 1 is a view schematically showing a center portion at a tip end portion of an embodiment of a cement kiln burner device to which a combustible waste injection device according to the present invention is attached.

FIG. 5 is a view schematically showing an example of a structure of the combustible waste injection device shown in FIGS. 4A and 4B.

MODE FOR CARRYING OUT THE INVENTION

Figure 2A:
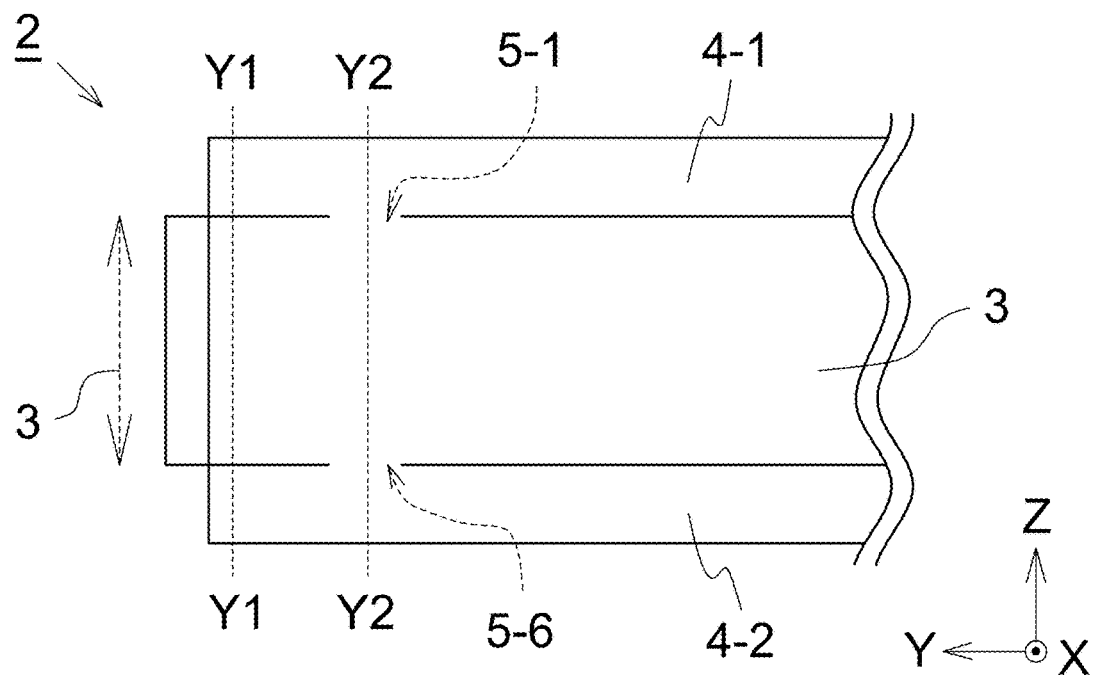
FIG. 2A is a vertical cross sectional view schematically showing a tip end portion of the embodiment of the combustible waste injection device according to the present invention.

A description will be given below of embodiments of a combustible waste injection device and a method for operating the same according to the present invention with reference to the accompanying drawings. The following drawings are schematically shown, and dimension ratios of the drawings do not match up with actual dimension ratios.

FIG. 1 is a view schematically showing a center portion of a tip end portion in an embodiment of a cement kiln burner device to which a combustible waste injection device according to the present invention is attached. In FIG. 1, FIG. 1(a) is a horizontal cross sectional view of the cement kiln burner device including the attached combustible waste injection device, and FIG. 1(b) is a vertical cross sectional view of the same. The horizontal cross sectional view indicates a cross sectional view obtained by cutting the cement kiln burner device with a plane which is orthogonal to an axial direction of the device, and the vertical cross sectional view indicates a cross sectional view obtained by cutting the cement kiln burner device with a plane which is parallel to the axial direction of the device.

In FIG. 1, a coordinate system is set by setting the axial direction of the cement kiln burner device (a direction of a primary air flow) to a Y direction, a vertical direction to a Z direction, and a direction which is orthogonal to a YZ plane to an X direction. In the following description, a description will be given by appropriately referring to the XYZ coordinate system. Describing by using the XYZ coordinate system, FIG. 1(a) corresponds to a cross sectional view when the cement kiln burner device is cut by the XZ plane, and FIG. 1(b) corresponds to a cross sectional view when the cement kiln burner device is cut by the YZ plane. In more detail, FIG. 1(b) corresponds to a cross sectional view when the cement kiln burner device is cut by the YZ plane in a cement kiln side end portion (a leading end surface of the cement kiln burner device).

Each of XYZ coordinate systems illustrated in FIGS. 2A to 4B and 6 mentioned later has the same axial relationship as the XYZ coordinate system illustrated in FIG. 1.

As shown in FIG. 1(a), a combustible waste flow channel 3 of a combustible waste injection device 2 attached to a cement kiln burner device 1 is arranged in an inner side of a powdered-solid-fuel flow channel 21 which is concentrically arranged in the cement kiln burner device 1, and at least one air flow channel 22 which is arranged inside in adjacent to the powdered-solid-fuel flow channel 21. An oil flow channel 31 for supplying a heavy oil can be arranged in an inner side of the air flow channel 22 in adjacent to the combustible waste flow channel 3 of the combustible waste injection device 2.

In FIG. 1, the air flow channel 22 has a swirl vane 22a serving as a swirling means in a cement kiln side end portion (in the vicinity of the injection port side). More specifically, an air flow ejected out of the air flow channel 22 forms a swirl air flow which is positioned inside a powdered-solid-fuel flow ejected out of the powdered-solid-fuel flow channel 21. The swirl vane 22a may be structured such that a swirl angle can be adjusted at a time point before the cement kiln burner device 1 starts operation.

As shown in FIG. 1(b), in an inner portion of the cement kiln burner device 1, an assist air flow channel 4 is provided in an outer side of the combustible waste flow channel 3, and is structured such that an assist air can flow into the combustible waste flow channel 3 via an assist air inflow port 5. In this regard, a description will be given with reference to FIGS. 2A and 2B.

Figure 2B:
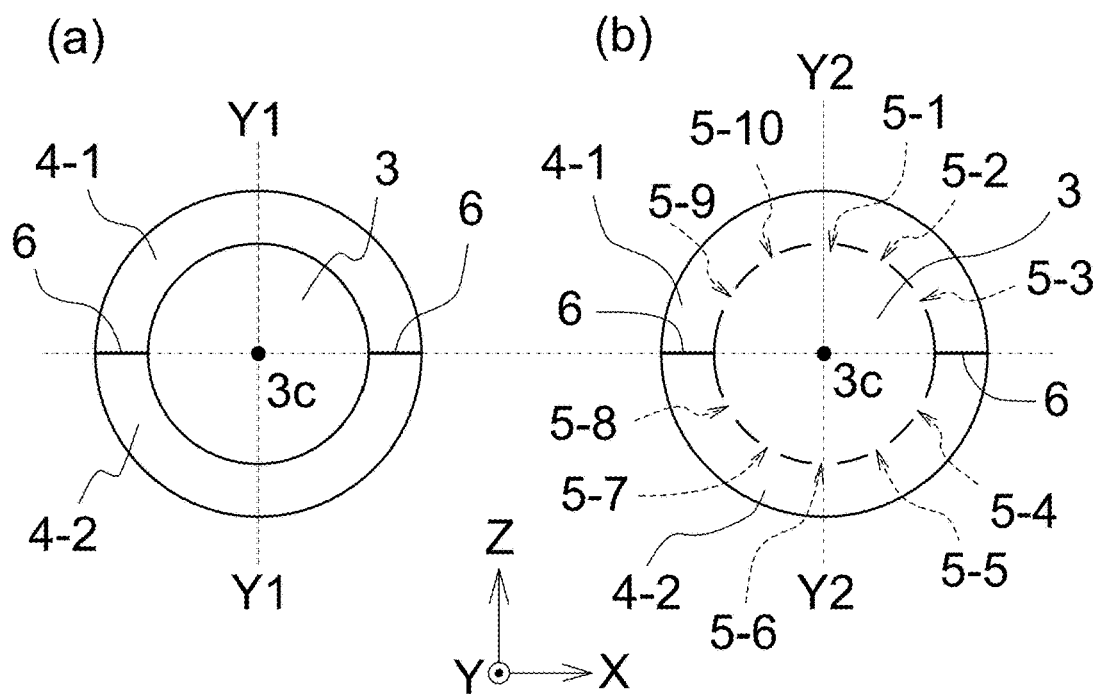
FIG. 2B is a horizontal cross sectional view schematically showing the tip end portion of the embodiment of the combustible waste injection device according to the present invention.

FIGS. 2A and 2B are views schematically showing a tip end portion of an embodiment of the combustible waste injection device 2 according to the present invention. FIG. 2A is a vertical cross sectional view of the combustible waste injection device 2, and FIG. 2B is a horizontal cross sectional view (corresponding to (a)) at a position where a Y-coordinate in FIG. 2A is Y1 (hereinafter, abbreviated simply to as "position of Y1"), and a horizontal cross sectional view (corresponding to (b)) at a position where the Y-coordinate is Y2 (hereinafter, abbreviated simply to as "position of Y2"). The position of Y1 corresponds to the vicinity of the tip end portion of the combustible waste flow channel 3 (that is, the vicinity of the injection port), and the position of Y2 corresponds to a position in an upstream side of the position of Y1 and away from the tip end portion of the combustible waste flow channel 3.

As shown in FIG. 2B, the assist air flow channel 4 is arranged in an outer side of the combustible waste flow channel 3. In more detail, the assist air flow channel 4 according to the present embodiment is concentrically arranged in an outer side of the combustible waste flow channel 3 formed into a cylindrical shape, and is divided by a partition member 6 into two flow channels, a vertically upper side assist air flow channel 4-1 and a vertically lower side assist air flow channel 4-2.

Further, as shown in FIG. 2B(b), an assist air inflow port 5 communicating the assist air flow channel 4 (4-1 and 4-2) and the combustible waste flow channel 3 is installed at the position of Y2, and is structured such that the assist air flowing through the assist air flow channel 4 can flow into the combustible waste flow channel 3 toward an axis center 3c of the combustible waste flow channel 3. In the present embodiment, the combustible waste flow channel 3 is provided at the position of Y2, with assist air inflow ports 5 (5-1 to 5-10) which are arranged at ten positions in a circumferential direction. In more detail, five assist air inflow ports (5-1 to 5-3, 5-9 and 5-10) are arranged in the assist air flow channel 4-1 side (vertically upper side), and five assist air inflow ports (5-4 to 5-8) are arranged in the assist air flow channel 4-2 side (vertically lower side).

In FIG. 2A, for convenience of illustration, only the assist air inflow ports (5-1 and 5-6) appear on the drawing among ten assist air inflow ports 5 (5-1 to 5-10).

A dedicated blower (not shown) or flow rate regulating valve (not shown) is connected to each of the assist air flow channels (4-1 and 4-2), and can independently control the assist air flow rate which is delivered to each of the assist air flow channels (4-1 and 4-2).

Figure 3:
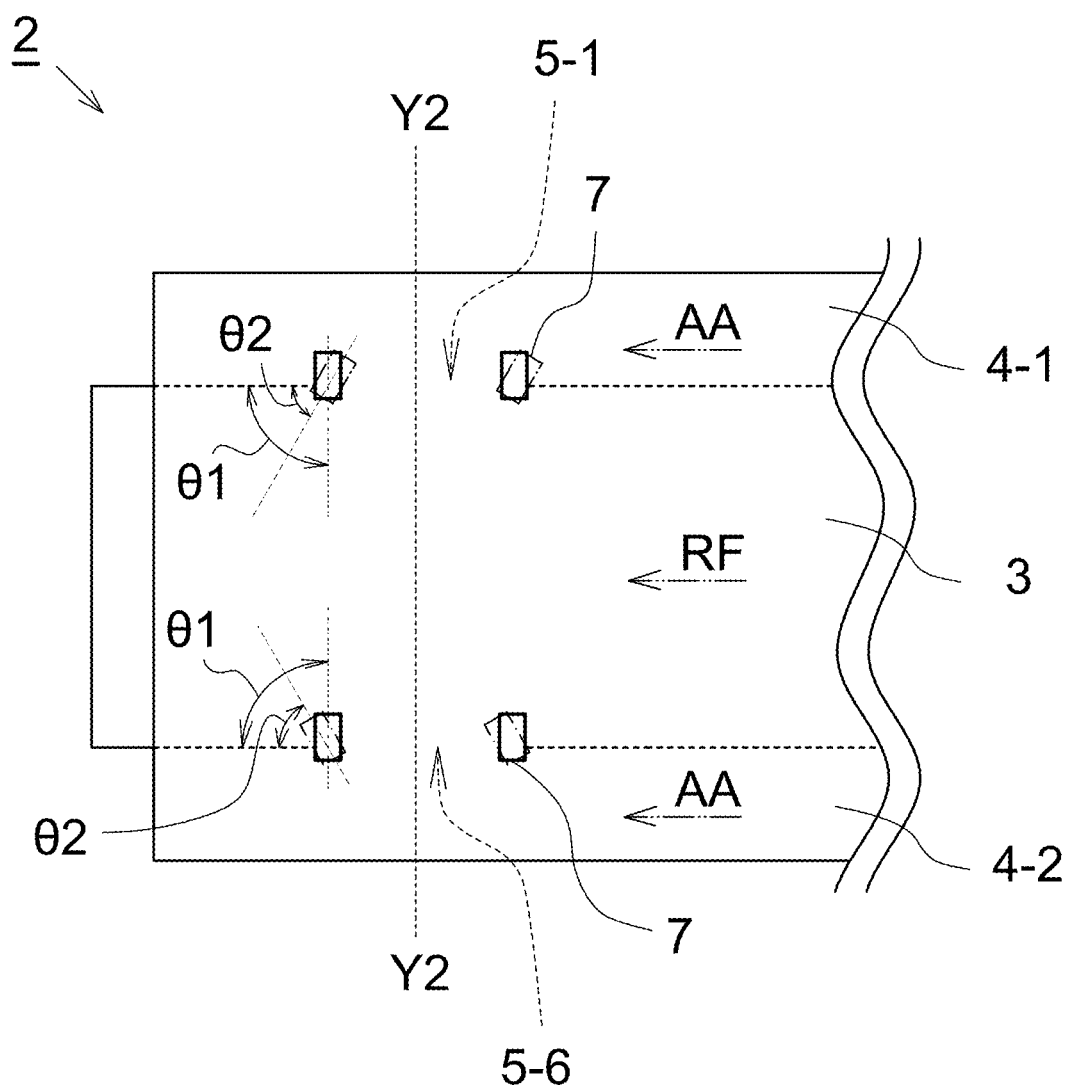
FIG. 3 is a partially enlarged view of FIG. 2A.

FIG. 3 is a view schematically showing the tip end portion of the embodiment of the combustible waste injection device 2 according to the present invention shown in FIG. 2A by enlarging a periphery of the assist air inflow ports (5-1 and 5-6).

As shown in FIG. 3, an assist air delivery tool 7 is installed in the assist air inflow ports (5-1 and 5-6) communicating the combustible waste flow channel 3 and the assist air flow channel 4. The assist air delivery tool 7 is provided for controlling an inflow angle θ (θ1 and θ2) which a direction of the assist air AA flowed into the combustible waste flow channel 3 forms with respect to the direction of the combustible waste RF flowing within the combustible waste flow channel 3. In FIG. 3, there are schematically shown respective modes of the assist air delivery tool 7 in the case of the inflow angle θ=θ1, and the case of the inflow angle θ=θ2. つつつつ b The inflow angle θ can be made more than 0 degrees and equal to or less than 90 degrees. In the case where the inflow angle θ of the assist air AA is 0 degrees, an effect of changing the flow of the combustible waste RF by the assist air AA can be hardly obtained, and in the case where the inflow angle θ goes beyond 90 degrees, the flow of the combustible waste RF is decelerated by the assist air AA and is excessively agitated. As a result, both the cases are not preferable.

Figure 4A:
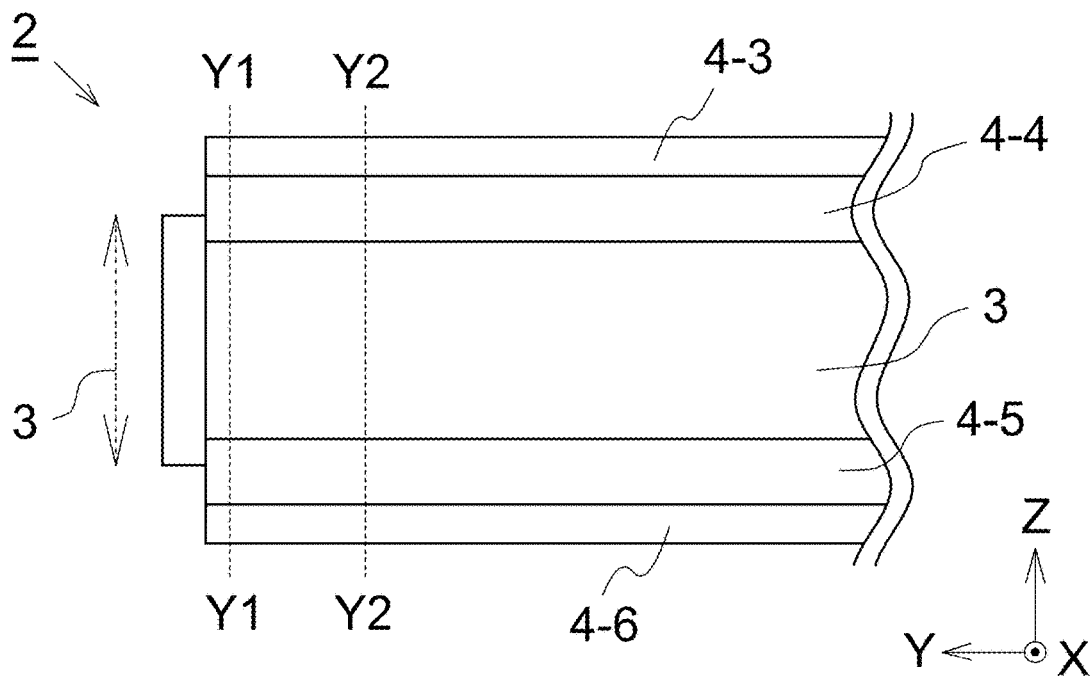
FIG. 4A is a vertical cross sectional view schematically showing a tip end portion of the other embodiment of the combustible waste injection device according to the present invention.
Figure 4B:
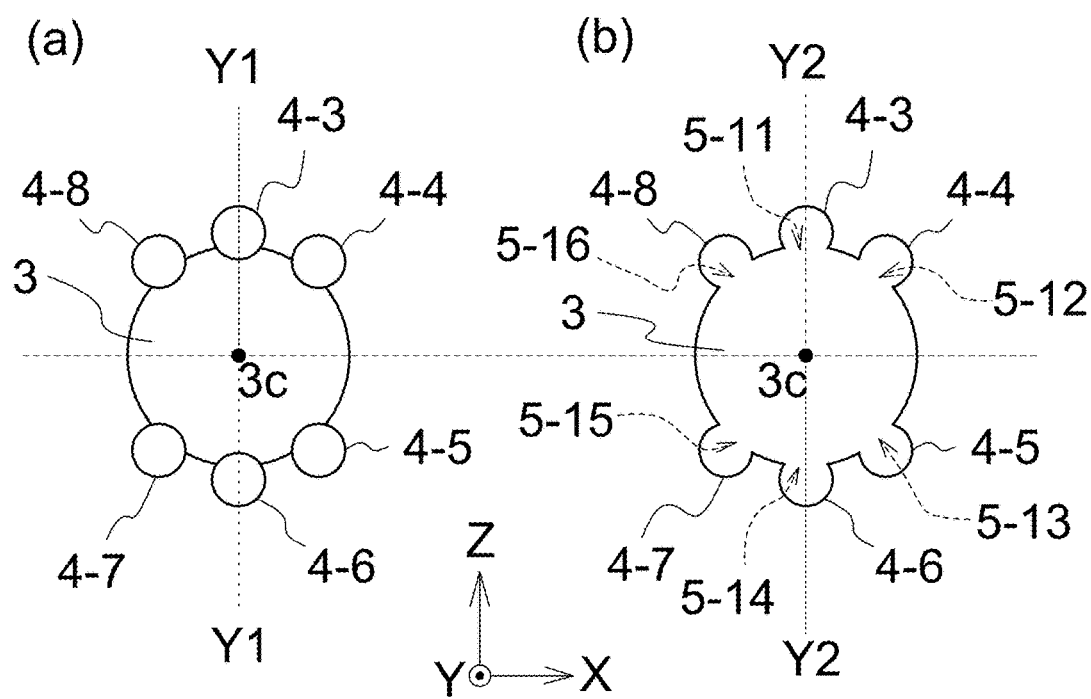
FIG. 4B is a horizontal cross sectional view schematically showing the tip end portion of the other embodiment of the combustible waste injection device according to the present invention.

FIGS. 4A and 4B are views schematically showing a tip end portion of the other embodiment of the combustible waste injection device 2 according to the present invention. FIG. 4A is a vertical cross sectional view of the combustible waste injection device 2 in the same manner as FIG. 2A, and FIG. 4B is a horizontal cross sectional view (corresponding to (a)) at a position of Y1 in FIG. 4A and a horizontal cross sectional view (corresponding to (b)) at a position of Y2, in the same manner as FIG. 2B. For convenience of illustration, the assist air inflow port 5 is not illustrated in FIG. 4A.

In the embodiment shown in FIG. 4B, the combustible waste flow channel 3 is provided at the position of Y2, with assist air inflow ports 5 (5-11 to 5-16) which are arranged at six positions in a circumferential direction. Further, the combustible waste flow channel 3 is provided with dedicated assist air flow channels (4-3 to 4-8) every assist air inflow ports (5-11 to 5-16). As a result, the assist air flow rates supplied to the respective assist air flow channels (4-3 to 4-8) can be independently controlled by respectively connecting dedicated blowers (not shown) or flow rate regulating valves (not shown) to the assist air flow channels 4-3 to 4-8. A description will be given of this regard with reference to FIG. 5.

FIG. 5 is a view schematically showing an example of a structure of the combustible waste injection device shown in FIG. 4. The combustible waste injection device 2 illustrated in FIG. 5 is constructed by valuing an easy control, and is provided with three blowing fans (F1 to F3), and six flow rate regulating valves (B113, B114, B118, B135, B136, and B137). The flow rate regulating valves (B113, B114, B118, B135, B136, and B137) are constructed, for example, by a gas valve.

The combustible waste RF supplied to a combustible waste transfer pipe 12 is supplied to the combustible waste flow channel 3 of the combustible waste injection device 2 by an air flow formed by the blowing fan F1. The air supplied from the blowing fan F2 is supplied as an assist air AA to the assist air flow channel 4 (4-3, 4-4, and 4-8) via an air pipe 11. In more detail, the air pipe 11 is branched by three branched pipes (113, 114, and 118), and the branched pipes are respectively communicated with the three assist air flow channels (4-3, 4-4, and 4-8). In the same manner, the air pipe 13 supplying the assist air AA from the blowing fan F3 is branched by three branched pipes (135, 136, and 137) and are communicated with three assist air flow channels (4-5, 4-6, and 4-7).

The branched pipes (113, 114, 118, 135, 136, and 137) are respectively provided with variable type flow rate regulating valves (B113, B114, B118, B135, B136, and B137), and the flow rate of the assist air AA circulating the branched pipes (113, 114, 118, 135, 136 and 137) can be independently controlled by regulating opening degrees of the flow rate regulating valves mentioned above.

More specifically, in the case of the combustible waste injection device 2 shown in FIGS. 4A, 4B and 5, the flow rate of the assist air AA can be independently every assist air inflow ports 5 (5-11 to 5-16) since the assist air inflow ports 5 (5-11 to 5-16) are provided in correspondence to the respective assist air flow channels 4 (4-3 to 4-8). As a result, it is possible to optionally change a rate of using the powdered-solid-fuel (the main fuel) and the combustible waste (the supplemental fuel) while maintaining the optimum state of the flame from the cement kiln burner.

The inventors of the present invention have found a basic limitation region for optimizing a control factor of the combustible waste injection device 2 by analyzing a flame shape from the cement kiln burner, a gas temperature distribution within the cement kiln, an oxygen concentration distribution within the cement kiln and a degree of an air flow turbulence within the cement kiln according to a combustion simulation (software: FLUENT produced by ANSYS JAPAN K. K.) of the cement kiln burner device 1 having the combustible waste injection device 2 attached thereto.

Figure 6:
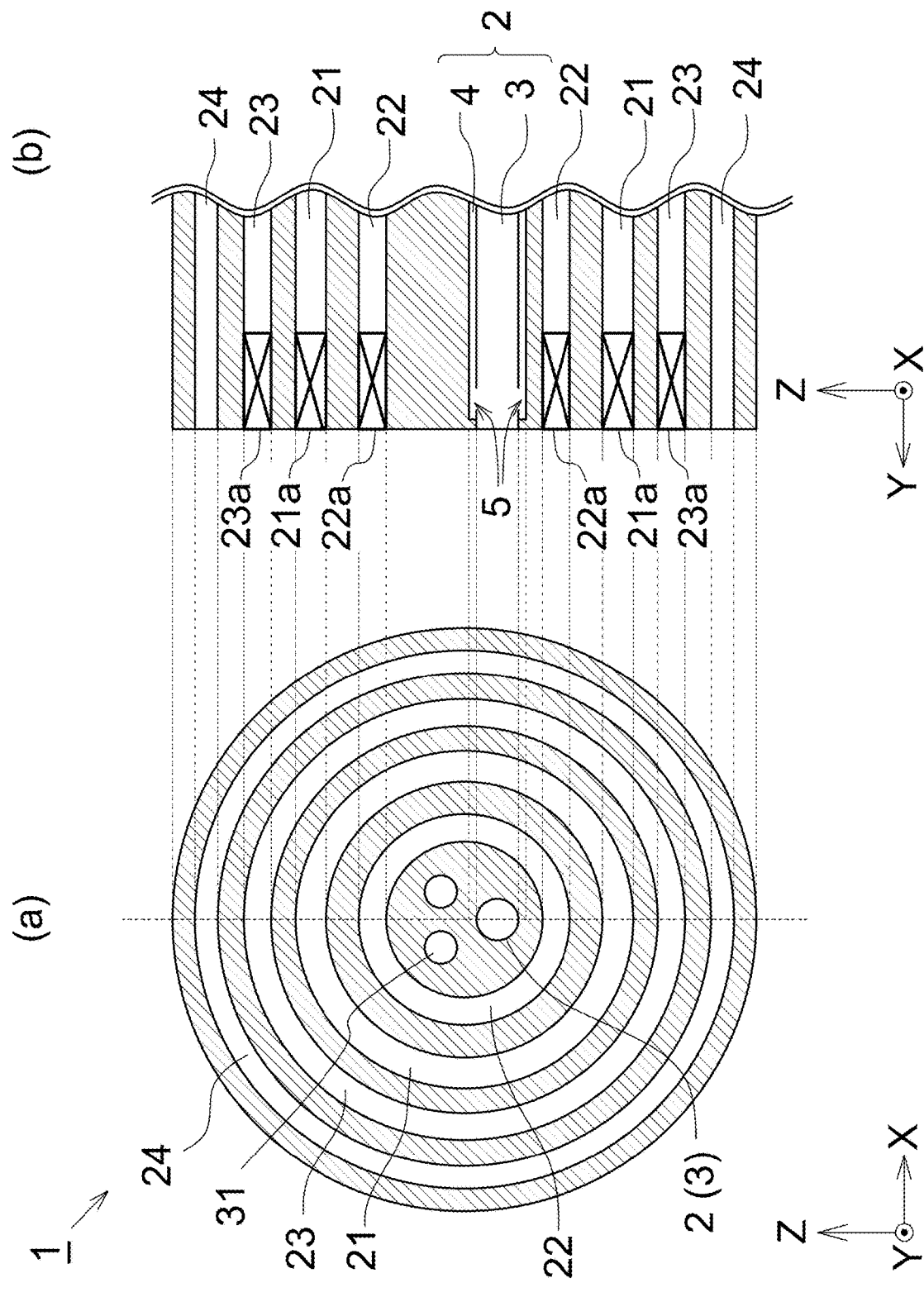
FIG. 6 is a view schematically showing a tip end portion of an embodiment of a cement kiln burner device to which a combustible waste injection device used in simulation is attached.

FIG. 6 schematically illustrates the structure of the cement kiln burner device 1 including the combustible waste injection device 2 used in the present simulation following to FIG. 1. The cement kiln burner device 1 shown in FIG. 6 is provided in addition to the structure shown in FIG. 1 with an air flow channel 23 which is arranged in an outer side of a powdered-solid-fuel flow channel 21 and has a swirl vane 23a arranged therein, and an air flow channel 24 which is arranged further outside the air flow channel 23. The air flow channel 24 is a flow channel which forms a straight air flow. More specifically, the cement kiln burner device 1 of a subject to be investigated by simulation is a so-called four-channel type burner device including totally four flow channels; an air flow channel 22 forming a swirl air flow, a powdered-solid-fuel flow channel 21 forming a swirl main fuel flow, an air flow channel 23 forming a swirl air flow, and an air flow channel 24 forming a straight air flow, from an inner side, as shown in FIG. 6(a).

The following Table 1 is an example of the basic limitation region according to the combustible waste injection device 2 which has been found under the specification and the condition for operating of the following cement kiln burner device 1. Table 1 corresponds to the embodiment of the combustible waste injection device 2 exemplified in FIG. 2.

<Specification of Cement Kiln Burner Device 1>

Number of channels: four channels (swirl air flow, swirl main fuel flow, swirl air flow and straight air flow from innermost shell side)

Combustible waste injection device 2: arranged in an inner side of an air flow channel 22 forming the swirl air flow and attached to a lower side of an axis center of the cement kiln burner device 1

Diameter of burner tip of cement kiln burner device 1: 700 mm

Inner diameter of injection port of combustible waste injection device 2: 175 mm Assist air inflow port 5: five circular holes having diameter of 16 mm in each of an upper side and a lower side in a vertical direction (30 degrees intervals in a range±60 degrees with respect to vertical axis)

<Condition for Operating Cement Kiln Burner Device 1>

The amount of combustion of main fuel C flowing in powdered-solid-fuel flow channel 21: 12 t/hour The amount of waste plastic (non-rigid plastic) which was processed as combustible waste RF: 5 t/hour The dimension of waste plastic serving as combustible waste RF: circular sheet shape obtained by punching a sheet having a thickness 0.5 mm with a diameter 30 mm The primary air flow rate (total amount of four channels) and temperature: 15000 $Nm^3$/hour, 30° C.

The secondary air flow rate and temperature: 100000 $Nm^3$/hour, 900° C.

The primary air flow rate from combustible waste injection device 2 and temperature: 5000 $Nm^3$, 30° C.

The blowing method of assist air AA from combustible waste injection device 2 and temperature: the assist air AA is added in a state in which the primary air flow rate from the combustible waste injection device 2 keeps the above value, 30° C.

TABLE 1

| Cement kiln burner device 1 in FIG. 6 | |
| --- | --- |
| Assist air flow rate | 5 volume % to 65 volume % of primary air flow rate of combustible waste injection device 2 |
| Rate r in vertical direction of assist air flow rate | (downward assist air flow rate)/(upward assist air flow rate) is 0.5 to 0.9 |
| Position of assist air inflow port 5 | 10 mm to 600 mm from injection port (end portion) of combustible waste flow channel 3 |
| Inflow angle θ of assist air | 0° < θ ≤ 90° |

In Table 1, there are listed as basic limitation regions an assist air AA amount (volume % of all the assist air flow rates with respect to a primary air flow rate of the combustible waste injection device 2), a rater of each of the assist air flow rates flowed into from a vertically upper side and a vertically lower side [(downward assist air flow rate flowed into from a vertically upper side of a horizontal plane including an axis center)/(upward assist air flow rate flowed into from a vertically lower side of the horizontal plane including the axis center)], a distance (mm) of the assist air inflow port 5 from an end portion of the combustible waste flow channel 3, and an inflow angle (°) of the assist air AA flowed into the combustible waste flow channel 3 from the assist air inflow port 5.

Among the items mentioned above, the flow rate of the assist air AA, the position of the assist air inflow port 5, and the rate r of the assist air AA amount in the vertical direction are important.

As mentioned above, it is necessary to form a good mixed state of the combustible waste RF, the main fuel C and the secondary air in order to facilitate regulation for obtaining a stable flame even when the fuel composition used for the cement kiln burner device 1 changes. In spite of the above fact, it is possible to regulate a degree of throttling of the combustible waste flow flowing through the combustible waste flow channel 3 by regulating the flow rate of the assist air AA, whereby it is possible to independently regulate a degree of diffusion of the combustible waste RF ejected out of the combustible waste injection device 2 during operation.

Taking into consideration the circumstance mentioned above, a flow rate V (Nm³/hour) of the assist air AA flowed into the combustible waste flow channel 3 from the assist air inflow port 5 per unit time is preferably between 5 volume % and 65 volume % of a primary air flow rate $V_0$ (Nm³/hour) flowing through the combustible waste flow channel 3. In the case where $V/V_0$ is less than 5 volume %, a throttle effect of the combustible waste flow cannot be obtained by the assist air AA, and in the case where $V/V_0$ goes beyond 65 volume %, the degree of diffusion of the combustible waste flow is enlarged, so that a part of the combustible waste RF may come into collision with an upper inner wall of the cement kiln. Further, in the case where the combustible waste is diffused in such a degree that a part of the combustible waste RF comes into collision with the kiln inner wall, the flame shape of the cement kiln burner is greatly disturbed, so that the quality of the cement clinker becomes unstable and the heat loss of the firebrick within the cement kiln is enlarged.

Further, the degree of diffusion of the combustible waste RF ejected out of the combustible waste injection device 2 can be regulated by changing the position (in more detail, the position in the Y direction) of the assist air inflow port 5 in the case where the flow rate of the assist air AA is fixed.

Taking into consideration the circumstance mentioned above, a distance in the Y direction from the injection port (end portion) of the combustible waste flow channel 3 to the assist air inflow port 5 is preferably within a range between 10 mm and 600 mm. In the case where the distance mentioned above is less than 10 mm, the degree of diffusion of the flow of the combustible waste RF is enlarged, and a part of the combustible waste RF may come into collision with the upper inner wall of the cement kiln. Further, in the case where the distance in the Y direction from the injection port of the combustible waste flow channel 3 to the assist air inflow port 5 goes beyond 600 mm, the diffusion effect of the combustible waste RF generated by the assist air AA may disappear.

The rate in the vertical direction of the flow rate of the assist air AA is important because the ejecting direction of the combustible waste RF can be vertically regulated by regulating the rate between the downward assist air flow rate flowed into from the vertically upper side and the upward assist air flow rate flowed into from the vertically lower side, whereby the combustible waste RF can be upward ejected out of the combustible waste injection device 2. As a result, it is possible to maintain the floating state of the combustible waste RF ejected by the assist air AA in a good diffusion state for a long period of time.

Taking into consideration the circumstance mentioned above, the rate r of the downward assist air flow rate flowed into from the vertically upper side with respect to the upward assist air flow rate flowed into from the vertically lower side is preferably set to a range between 0.5 and 0.9. In the case where the rate r is less than 0.5, the combustible waste flow greatly blows up from the lower side of the combustible waste flow, and a part of the combustible waste RF may come into collision with the upper inner wall of the cement kiln. Further, in the case where the rate r is greater than 0.9, the effect that the combustible waste flow is directed upward cannot be obtained, and a lot of combustible waste RF landing combustion may be generated.

As mentioned above, according to the present invention, it is possible to optimize a condition for operating the combustible waste injection device 2 and stabilize the frame state of the cement kiln burner by setting the position of the assist air inflow port 5 and the inflow angle θ to the range shown in Table 1 before the operation of the combustible waste injection device 2, and further regulating the assist air flow rate V and the rate r from the vertical direction of the assist air flow rate by the blowing fan and/or the flow rate regulating valve when operating the combustible waste injection device 2.

Next, a description will be given of a combustion simulation about a rate (a kiln inside falling rate) that the combustible waste RF (here, non-rigid plastic) performs landing combustion in the case where each of the items in Table 1 is changed.

In particular, the case where each of the items in Table 1 is changed was investigated according to simulation (software: FLUENT produced by ANSYS JAPAN K. K.) in the case where the specification and the condition for operating of the cement kiln burner device 1 mentioned above are fixed. A set value of each of the items in the simulation is shown in Table 2. As a current example (Comparative Example) which does not use the assist air AA, an amount of combustible waste RF which was processed was set to two levels (5 t/hour and 2 t/hour).

Figure 7:
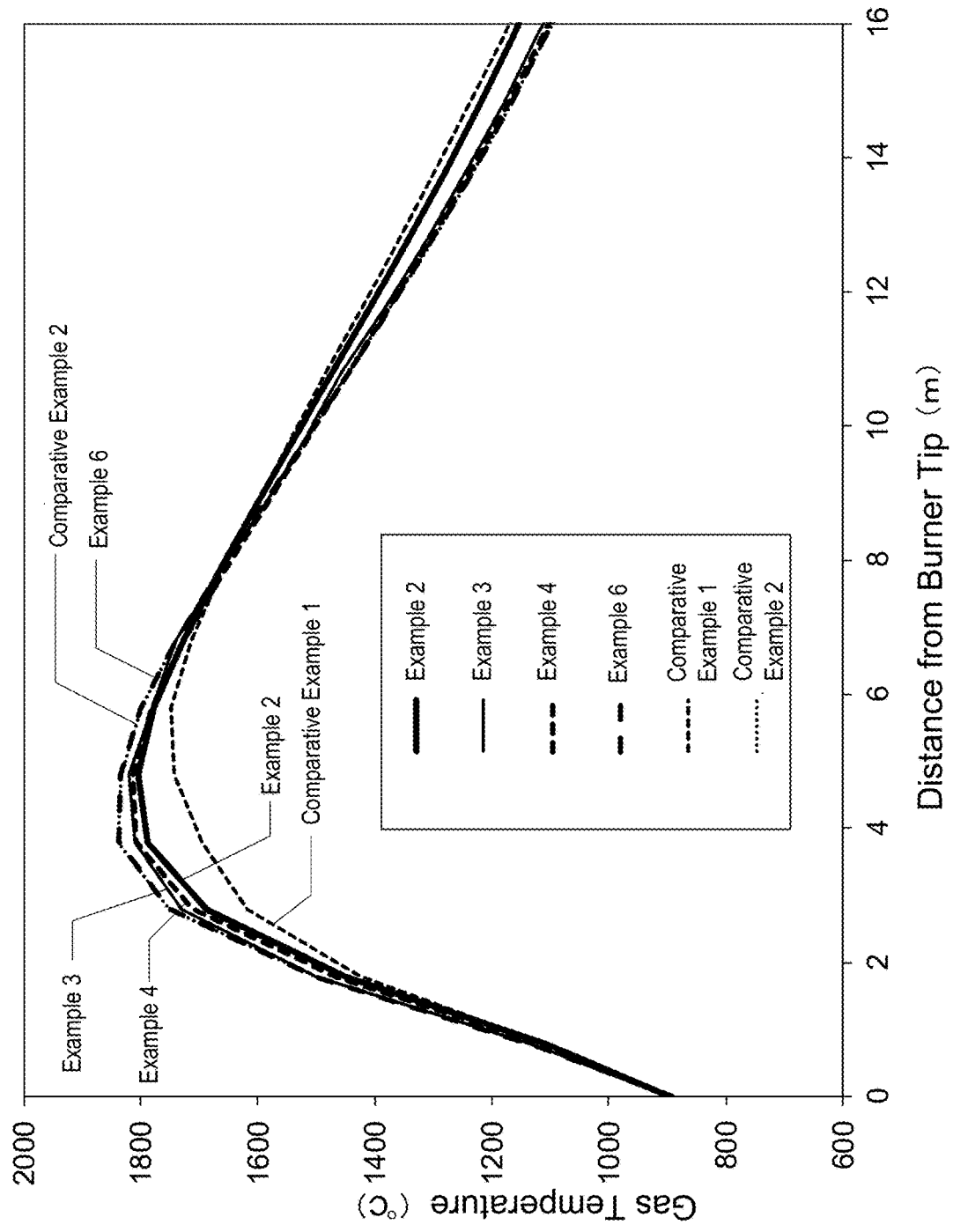
FIG. 7 is a graph showing a result of simulation according to a distribution of gas temperatures within cement kilns according to Examples 2 to 4 and 6 and Comparative Examples 1 to 2 in the case where a waste plastic having a diameter of 30 mm is used as a supplemental fuel at a fixed amount with respect to a main fuel (a pulverized coal) under a condition for operating shown in Table 2, with the combustible waste injection device shown in FIG. 6.

A kiln inside falling rate of the combustible waste RF (non-rigid plastic having a diameter of 30 mm and a thickness of 0.5 mm) obtained as a result of the simulation is shown in Table 3, and gas temperature distributions within the kiln of Examples 2 to 4 and 6, and Comparative Examples 1 to 2 are shown in FIG. 7.

TABLE 2

|  | Assist air flow rate ((assist air flow rate)/(primary air flow rate flowing through combustible waste flow channel 3)) (vol %) | Rate r of assist air flow rate in vertical direction (downward assist air flow rate)/(upward assist air flow rate) | Position of assist air inflow port 5 (distance from end portion) (mm) | Inflow angle θ of assist air AA (°) |
| --- | --- | --- | --- | --- |
| Example 1 | 10 | 0.67 | 50 | 90 |
| Example 2 | 25 | 0.67 | 50 | 90 |
| Example 3 | 60 | 0.67 | 50 | 90 |
| Example 4 | 25 | 0.50 | 50 | 90 |
| Example 5 | 25 | 0.90 | 50 | 90 |
| Example 6 | 25 | 0.80 | 50 | 90 |
| Example 7 | 25 | 0.80 | 500 | 90 |
| Example 8 | 25 | 0.80 | 50 | 45 |
| Reference example 1 | 25 | 0.80 | 750 | 90 |
| Reference example 2 | 25 | 0.80 | 50 | 0 |
| Comparative example 1 (RF: 5 t/hour) | — (without assist air) | — (without assist air) | — (without assist air) | — (without assist air) |
| Comparative example 2 (RF: 2 t/hour) | — (without assist air) | — (without assist air) | — (without assist air) | — (without assist air) |

TABLE 3

|  | Kiln inside falling rate of combustible waste RF (mass %) |
| --- | --- |
| Example 1 | 2.4 |
| Example 2 | 1.0 |
| Example 3 | 0.4 |
| Example 4 | 0.8 |
| Example 5 | 1.7 |
| Example 6 | 1.3 |
| Example 7 | 2.3 |
| Example 8 | 2.2 |
| Reference example 1 | 3.0 |
| Reference example 2 | 3.1 |
| Comparative example 1 | 3.0 |
| Comparative example 2 | 0.5 |

According to the results in Table 3, it is confirmed that the kiln inside falling rate of the combustible waste RF can be sufficiently lowered in the level of each of Examples 1 to 8 in comparison with the level of Comparative Example 1 in which the condition for the amount of the combustible waste RF which was processed is in common with 5 t/hour. Particularly, Examples 2 to 4 can be lowered to one third or less in the value of the kiln inside falling rate in comparison with Comparative Example 1 having the current condition for operating. As a result, according to the combustible waste injection device and the method for operating the combustible waste injection device of the present invention, it is confirmed that the combustible waste RF can be effectively burnt.

According to the Reference Example 1 in which the position of the assist air inflow port 5 is provided at a position which is extremely away from the injection port (cement kiln side end portion) of the combustible waste flow channel 3, the kiln inside falling rate indicates a high value in comparison with each of the examples. This means that the effect of throttling the flow of the combustible waste RF into the direction of the axis center cannot be sufficiently obtained in the vicinity of the injection port, since the assist air inflow port 5 is installed extremely in the upstream side of the injection port.

Further, in the Reference Example 2 in which the inflow angle of the assist air AA flowed into the combustible waste flow channel 3 from the assist air inflow port 5 is set to 0 degrees, the kiln inside falling rate becomes also a high value in comparison with each of the examples. This means that the assist air AA inherently affects hardly the combustible waste flow within the combustible waste flow channel 3.

Further, in the temperature distribution of the gas within the cement kiln shown in FIG. 7, the temperature distributions of the gas in Examples 2 to 4, and 6 is substantially identical to that of the case where the amount of the combustible waste RF which was processed is set to 2 t/hour under the current condition for operating of Comparative Example 2. The condition for operating of Comparative Example 2 is obtained by setting the supply amount of the combustible waste RF less than each of the examples, in which the kiln inside falling rate of the combustible waste RF is 0.5 mass %, corresponding to a good kiln burner combustion state. On the other hand, in Comparative Example 1 having the same amount of the combustible waste RF which was processed as the present Example (5 t/hour) under the current condition for operating, a lot of combustible wastes RF perform land combustion, that is, the kiln inside falling rate of the combustible waste RF is 3.0 mass %, as well as the temperature of the gas within the cement kiln is greatly lowered. More specifically, according to the present invention, it is confirmed that the combustible waste RF can be utilized as the supplemental fuel without greatly changing the temperature distribution of the gas within the cement kiln.

In other words, according to the present invention, it can be understood that the combustible waste can be utilized as the supplemental fuel while keeping an optimum combustion state of the cement kiln burner.

The installing number and the installing place of the assist air inflow port provided in the combustible waste injection device are not limited to the structures of the embodiments mentioned above.

DESCRIPTION OF REFERENCE SIGNS 1 cement kiln burner device
2 combustible waste injection device 3 combustible waste flow channel
3c axis center of combustible waste flow channel
4 assist air flow channel
4-1, 4-2 assist air flow channel
4-3, 4-4, 4-5, 4-6, 4-7, 4-8 assist air flow channel
5 assist air inflow port
5-1, 5-2, 5-3, 5-4, 5-5, 5-6, 5-7, 5-8, 5-9, 5-10 assist air inflow port
5-11, 5-12, 5-13, 5-14, 5-15, 5-16 assist air inflow port
6 partition member
7 assist air delivery tool
11 air pipe
12 combustible waste transfer pipe
13 air pipe
21 powdered-solid-fuel flow channel
22 air flow channel (first air flow channel)
22a swirl vane
31 oil flow channel
113, 114, 118 branched pipe
135, 136, 137 branched pipe
AA assist air
B113, B114, B135, B136, B137, B118 flow rate regulating valve
F1, F2, F3 blowing fan
RF combustible waste
θ inflow angle

What is claimed is:

1. A combustible waste injection device which can be attached to a cement kiln burner device having at least one air flow channel in an inner side of a powdered-solid-fuel flow channel, the combustible waste injection device comprising:
a combustible waste flow channel which is arranged in an inner side of the air flow channel in an innermost shell, is installed in parallel to an axial direction of the cement kiln burner device and is provided for flow feeding a combustible waste flow;
an assist air flow channel which is installed in parallel to the combustible waste flow channel, at a position outside the combustible waste flow channel; and
an assist air inflow port communicating the assist air flow channel and the combustible waste flow channel in the vicinity of an injection port of the combustible waste flow channel,
wherein the assist air flow channel includes an upper side flow channel located above a horizontal plane including the axis center of the combustible waste flow channel when cutting with a plane orthogonal to the axis center of the combustible waste flow channel, and a lower side flow channel located below the horizontal plane and partitioned with respect to the upper side flow channel,
the assist air inflow port is arranged at a plurality of positions in relation to a circumferential direction sandwiching in a vertical direction the horizontal plane, and
the combustible waste injection device further comprises a flow controller which independently controls a flow rate through each of the upper and lower side flow channels.

2. The combustible waste injection device according to claim 1,
wherein the assist air flow channel is communicated with the combustible waste flow channel via the assist air inflow port and be shielded from the combustible waste flow channel in an upstream side of the assist air inflow port.

3. The combustible waste injection device according to claim 1, wherein the assist air inflow port is installed in a range between 10 mm and 600 mm from the injection port of the combustible waste flow channel.

4. The combustible waste injection device according to claim 1, wherein the assist air inflow port is provided with an assist air delivery tool which can regulate an inflow angle of the assist air flow flowed into the combustible waste flow channel with respect to the flow feeding direction of the combustible waste flow which flow feeds within the combustible waste flow channel.

5. A method for operating the combustible waste injection device, which can be attached to a cement kiln burner device having at least one air flow channel in an inner side of a powdered-solid-fuel flow channel, the combustible waste injection device comprising:
a combustible waste flow channel which is arranged in an inner side of the air flow channel in an innermost shell, is installed in parallel to an axial direction of the cement kiln burner device and is provided for flow feeding a combustible waste flow;
an assist air flow channel which is installed in parallel to the combustible waste flow channel, at a position outside the combustible waste flow channel; and
an assist air inflow port communicating the assist air flow channel and the combustible waste flow channel in the vicinity of an injection port of the combustible waste flow channel,
wherein the assist air inflow port is arranged at a plurality of positions sandwiching in a vertical direction a horizontal plane including the axis center of the combustible waste flow channel when cutting with a plane orthogonal to the axis center of the combustible waste flow channel, and
wherein an upward assist air flow rate from the assist air flow channel to the combustible waste flow channel via the assist air inflow port located vertically below the horizontal plane is more than a downward assist air flow rate from the assist air flow channel to the combustible waste flow channel via the assist air inflow port located vertically above the horizontal plane.

6. The method for operating the combustible waste injection device according to claim 5, wherein a total amount of the air flow rates flowed into the combustible waste flow channel from the assist air inflow port is between 5 volume % to 65 volume % of the primary air flow rate flowing in the combustible waste flow channel.

7. The method for operating the combustible waste injection device according to claim 5, wherein a rate of the downward assist air flow rate with respect to the upward assist air flow rate is between 0.5 and 0.9.

8. The method for operating the combustible waste injection device according to claim 5, wherein an inflow angle of the assist air flow flowed into the combustible waste flow channel is greater than 0 degrees and equal to or less than 90 degrees with respect to the flow feeding direction of the combustible waste flow which flow feeds within the combustible waste flow channel.

* * * * *